US012715416B2

(12) United States Patent
Zeutzius

(10) Patent No.: US 12,715,416 B2
(45) Date of Patent: Aug. 25, 2026

(54) PREDICTION SYSTEM AND PREDICTION METHOD FOR AT LEAST ONE BRAKE SYSTEM COMPONENT OF A BRAKE SYSTEM OF A VEHICLE

(71) Applicant: Robert Bosch GmbH, Stuttgart (DE)

(72) Inventor: Michael Zeutzius, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 97 days.

(21) Appl. No.: 18/560,739

(22) PCT Filed: May 12, 2022

(86) PCT No.: PCT/EP2022/062944
§ 371 (c)(1),
(2) Date: Jan. 19, 2024

(87) PCT Pub. No.: WO2022/243168
PCT Pub. Date: Nov. 24, 2022

(65) Prior Publication Data

US 2024/0253609 A1 Aug. 1, 2024

(30) Foreign Application Priority Data

May 19, 2021 (DE) ..................... 10 2021 205 089.1

(51) Int. Cl.
*B60T 17/22* (2006.01)

(52) U.S. Cl.
CPC ........... *B60T 17/22* (2013.01); *B60T 2210/12* (2013.01); *B60T 2210/20* (2013.01);
(Continued)

(58) Field of Classification Search
CPC .... B60T 17/22; B60T 17/221; B60T 2210/12; B60T 2210/20; B60T 2210/30;
(Continued)

(56) References Cited

U.S. PATENT DOCUMENTS 5,732,377 A * 3/1998 Eckert .................... B60T 8/1755 303/146
6,418,369 B2 * 7/2002 Matsumoto ............. B60T 8/172 180/197
(Continued)

FOREIGN PATENT DOCUMENTS

CN 101068702 A * 11/2007 .............. B60T 8/172
CN 102024095 A * 4/2011 .......... B60W 40/068
(Continued)

OTHER PUBLICATIONS

Castillo, et al., "A Novel Electrohydraulic Brake System With Tire-Road Friction Estimation and Continuous Brake Pressure Control, " in IEEE Transactions on Industrial Electronics, vol. 63, No. 3, pp. 1863-1875, Mar. 2016, doi: 10.1109/TIE.2015.2494041 (https://ieeexplore.ieee.org/document/7305764) (Year: 2016).*
(Continued)

*Primary Examiner* — Atul Trivedi
(74) *Attorney, Agent, or Firm* — NORTON ROSE FULBRIGHT US LLP

(57) ABSTRACT

A prediction system and a prediction method for at least one brake system component of a brake system of a vehicle by ascertaining value groups of in each case at least two different variables during at least one driver-induced and/or autonomous braking process of the vehicle, the at least two variables of the same value group are ascertained simultaneously and in a braking situation in which at least one of the variables lies outside its respective specified normal value range and/or a temporal derivative of at least one of the variables lies outside a quasi-static range respectively specified for the respective variable, and estimating, using the ascertained value groups, whether the occurrence of at least one functional impairment of at least the one brake system
(Continued)

component of the brake system is probable at least during a specified prediction time interval.

13 Claims, 17 Drawing Sheets

(52) U.S. Cl.
CPC ....... *B60T 2210/30* (2013.01); *B60T 2220/04* (2013.01); *B60T 2250/04* (2013.01); *B60T 2270/406* (2013.01); *B60T 2270/413* (2013.01)

(58) Field of Classification Search
CPC ............. B60T 2220/04; B60T 2250/04; B60T 2270/406; B60T 2270/413; B60Y 2400/81
USPC .......................................................... 701/31.4
See application file for complete search history.

(56) References Cited

U.S. PATENT DOCUMENTS

| | | | | |
|---|---|---|---|---|
| 7,240,972 | B2 * | 7/2007 | Nakano | B60T 8/4836 303/178 |
| 2009/0248250 | A1 * | 10/2009 | Yasui | B62D 6/008 701/42 |
| 2010/0268420 | A1 * | 10/2010 | Yasui | B60T 8/17555 701/41 |
| 2016/0052500 | A1 * | 2/2016 | Foitzik | G01F 1/00 73/54.01 |
| 2017/0217419 | A1 * | 8/2017 | Yen | B60T 7/042 |
| 2017/0320474 | A1 * | 11/2017 | Svensson | B60T 17/02 |
| 2018/0229698 | A1 * | 8/2018 | Salmon | B60T 7/12 |
| 2019/0299946 | A1 * | 10/2019 | Miller, Jr. | B60T 8/38 |
| 2020/0086880 | A1 * | 3/2020 | Poeppel | B60T 8/17636 |
| 2020/0089243 | A1 * | 3/2020 | Poeppel | B60W 60/00 |
| 2020/0255019 | A1 * | 8/2020 | Sekizawa | B60W 40/06 |
| 2020/0256672 | A1 * | 8/2020 | Sekizawa | G06N 20/10 |
| 2020/0324744 | A1 * | 10/2020 | Mizusaki | B60T 13/686 |
| 2020/0398801 | A1 * | 12/2020 | Woerz | B60T 17/22 |
| 2021/0070268 | A1 * | 3/2021 | Passmann | B60T 8/172 |
| 2021/0206379 | A1 * | 7/2021 | Bobier-Tiu | B60T 8/17551 |
| 2023/0347859 | A1 * | 11/2023 | Staats | B60T 17/22 |
| 2024/0190408 | A1 * | 6/2024 | Bani Milhim | B60T 17/221 |
| 2024/0217499 | A1 * | 7/2024 | Zeutzius | B60W 50/04 |
| 2024/0227767 | A1 * | 7/2024 | Zeutzius | B60T 17/221 |
| 2024/0253609 | A1 * | 8/2024 | Zeutzius | B60T 17/221 |
| 2024/0300467 | A1 * | 9/2024 | Zeutzius | B60T 8/885 |
| 2025/0001996 | A1 * | 1/2025 | Kling | B60T 17/222 |

FOREIGN PATENT DOCUMENTS

| | | | | | |
|---|---|---|---|---|---|
| DE | 102017101510 | A1 * | 8/2017 | G07C 5/08 |
| DE | 10 2017 218 446 | A1 | 5/2018 | |
| DE | 102020102590 | A1 * | 7/2021 | B60T 13/48 |
| EP | 3753794 | A1 * | 12/2020 | B60T 17/221 |
| EP | 4342753 | A1 * | 3/2024 | B60T 8/172 |
| GB | 2473436 | A * | 3/2011 | B60W 40/068 |
| GB | 2523755 | A * | 9/2015 | B60T 17/22 |
| JP | H08080840 | A | 3/1996 | |
| WO | WO-2020249185 | A1 * | 12/2020 | G07C 5/0816 |
| WO | WO-2020250695 | A1 * | 12/2020 | B60T 17/225 |
| WO | WO-2022243156 | A1 * | 11/2022 | B60T 8/885 |
| WO | WO-2022243166 | A1 * | 11/2022 | B60W 50/0205 |
| WO | WO-2022243168 | A1 * | 11/2022 | B60T 17/221 |
| WO | WO-2022243170 | A1 * | 11/2022 | B60W 50/04 |
| WO | WO-2024055646 | A1 * | 3/2024 | B60T 17/22 |

OTHER PUBLICATIONS

International Search Report for PCT/EP2022/062944, Issued Oct. 18, 2022.

* cited by examiner

PREDICTION SYSTEM AND PREDICTION METHOD FOR AT LEAST ONE BRAKE SYSTEM COMPONENT OF A BRAKE SYSTEM OF A VEHICLE

FIELD

The present invention relates to a prediction system for at least one brake system component of a brake system of a vehicle. The present invention also relates to a prediction method for at least one brake system component of a brake system of a vehicle.

BACKGROUND INFORMATION

Methods for monitoring a motor vehicle are described in the related art. For example, German Patent Application No. DE 10 2017 218 446 A1 describes a method for monitoring a motor vehicle with an automated driving function, with which, in particular, an energy storage device, which supplies at least one consumer designed to bring the motor vehicle to a standstill, is monitored.

SUMMARY

The present invention provides a prediction system for at least one brake system component of a brake system of a vehicle and a prediction method for at least one brake system component of a brake system of a vehicle.

The present invention provides advantageous possibilities not only for monitoring, but also for early diagnosis of at least one brake system component of a brake system of a vehicle. Thus, the present invention enables not only a recognition of a failure of at least the one brake system component of the respective brake system that has already occurred, but also a prediction with respect to a future functionality and a future operating behavior of at least the one brake system component of the brake system. As will be explained in more detail below, for a large number of different brake system components, such as for an electromechanical brake booster upstream of a master brake cylinder of the respective brake system and/or for a motorized plunger device integrated into the respective brake system (such as specifically an IPB, integrated power brake), their future functionality can be reliably predicted by means of the present invention. Since a future functional impairment or a future failure of at least the one brake system component of the respective brake system can be predicted at an earlier stage by using the present invention, it is also advantageously suitable for safeguarding autonomous driving of the vehicle equipped with the respective brake system.

A particular advantage of the present invention is that it allows for the use of, in particular, dynamic brake actuations and/or braking processes with high dynamic loads requested by the respective automatic brake or vehicle control system and/or the controller of the vehicle to predict the possible occurrence of at least one functional impairment in at least the one brake system component of the brake system. The present invention thus takes into account the fact that signs of imminent functional impairment or even failure of at least the one brake system component can be detected with a relatively high probability, particularly in the case of braking processes with high and/or dynamic loads, whereas such signs can be detected comparatively rarely in the case of slow/quasi-static braking processes. This makes it particularly advantageous if only braking processes with high and/or dynamic loads are evaluated to predict the continued functionality of the at least one brake system component. In this way, the amount of work required for prediction can be significantly reduced. In this way, it is also frequently possible to reduce the memory requirements of the electronics used for prediction.

In an advantageous embodiment of the prediction system of the present invention, the first electronic device and/or the second electronic device are designed and/or programmed to enter the value groups into a coordinate system with at least one first axis indicating the at least one first variable and at least one second axis indicating the at least one second variable. Such a coordinate system with the entered value groups can be advantageously evaluated for the subsequent prediction.

As an advantageous further development of the present invention, the first electronic device can additionally be designed and/or programmed to ascertain value groups that, in addition to the at least one first variable and the at least one second variable, also comprise a friction coefficient of a road on which the vehicle is simultaneously traveling. This enables a special "comparison" of the detected friction coefficient with a relation between the at least one first variable and the at least one second variable in the subsequent prediction. In this way, it is possible to recognize at an early stage whether the at least one brake system component of the brake system is still responding "as desired" to a braking process requested by the driver, the automatic brake or drive control system of the vehicle and/or the controller of the vehicle. The knowledge gained can subsequently be used to predict at least one brake system component.

For example, the first electronic device and/or the second electronic device are designed and/or programmed to enter the value groups into the coordinate system that, in addition to the at least one first axis and the at least one second axis, also comprises at least one friction coefficient axis indicating the friction coefficient or sectors indicating the friction coefficient in a plane spanned by the or one of the first axes and the or one of the second axes. Thus, the coordinate system can be used advantageously to verify whether the respective relationship between the at least one first variable and the at least one second variable behaves in accordance with the respective friction coefficient.

In a further advantageous embodiment of the prediction system of the present invention, the first electronic device is additionally designed and/or programmed to ascertain value groups that, in addition to the at least one first variable and the at least one second variable, also comprise at least one third variable, wherein the at least one third variable is ascertained simultaneously with the at least one first variable and the at least one second variable of the same value group and represents an environmental parameter. This further improves the prediction for at least the one brake system component of the vehicle made by means of the embodiment of the prediction system described here. In particular, a probable maximum driving range can be reliably estimated using the embodiment of the prediction system described here by also taking at least one environmental condition into account in the prediction.

According to an example embodiment of the present invention, preferably, the first electronic device and/or the second electronic device are designed and/or programmed to enter the value groups into the coordinate system that, in addition to the at least one first axis and the at least one second axis, also comprises at least one third axis indicating the at least one third variable. In this way, the large number of different variables can be examined in a simple, rapid and reliable manner by evaluating the coordinate system described below with respect to the possible occurrence of at least one functional impairment on at least the one brake system component.

According to an example embodiment of the present invention, preferably, the first electronic device and/or the second electronic device are designed and/or programmed to assign brake operating points in each case to the value groups entered in the coordinate system and to estimate, taking additional account of a distribution of the brake operating points, whether the occurrence of at least one functional impairment is probable in at least the one brake system component of the brake system, at least during the specified prediction time interval. This improves the prediction for at least the one brake system component of the brake system executed by means of the embodiment of the prediction system described here, in that the technique described here ensures that value groups for braking processes with high and/or dynamic loads are matched as correct operating states of the brake system with a brake characteristic diagram of the coordinate system and are not interpreted as a malfunction.

In a particularly advantageous embodiment of the prediction system of the present invention, the first electronic device can be or is mounted on the vehicle and is designed and/or programmed to control a first communication device of the first electronic device or of the vehicle equipped with the first electronic device to transmit data comprising the ascertained value groups and/or at least one coordinate system with the ascertained value groups to a second communication device of the second electronic device, which is separate from the vehicle, wherein the second communication device is designed to receive the value groups transmitted by the first communication device. In this case, it is not necessary to assemble the second electronic device, which is also used for the advantageous prediction, on the vehicle. With the embodiment of the prediction system according to the present invention described here, the second electronic device can therefore easily be designed with a comparatively large volume and/or a relatively high weight. In addition, with the embodiment of the prediction system of the present invention described here, the second electronic device can also receive, from a plurality of vehicles, the value groups/coordinate systems transmitted by the first communication devices of their first electronic devices, such that the second electronic device of the prediction system can be used for a large number of vehicles for monitoring and for early diagnosis of at least the one brake system component of their respective brake system.

The advantages described above are also ensured when executing a corresponding prediction method for at least one brake system component of a brake system of a vehicle, according to the present invention.

With an advantageous embodiment of the prediction method according to the present invention, a rod path of an input rod connected to the brake pedal, an adjustment speed of the input rod, a target motor current of a motor of a motorized brake pressure build-up device of the brake system requested by the automatic brake or drive control system and/or the controller, a target operating voltage of the motor of the motorized brake pressure build-up device requested by the automatic brake or drive control system and/or the controller, a target motor torque of the motor of the motorized brake pressure build-up device requested by the automatic brake or drive control system and/or the controller, a target power consumption of the motor of the motorized brake pressure build-up device requested by the automatic brake or drive control system and/or the controller, a target adjustment path of at least one adjustable piston of the motorized brake pressure build-up device requested by the automatic brake or drive control system and/or the controller, and/or a target pumping rate of at least one pump used in the brake system requested by the automatic brake or drive control system and/or the controller are ascertained as the at least one first variable. The examples listed here for the at least one brake request specification variable can be measured by means of the sensors that are conventionally already used on every type of vehicle or can be reliably read out from at least one signal from the automatic brake or drive control system and/or the controller.

Alternatively or in addition, according to an example embodiment of the present invention, a master brake cylinder pressure in a master brake cylinder of the brake system, at least one brake pressure in at least one wheel brake cylinder of the brake system, a motor current of the motor of the motorized brake pressure build-up device of the brake system, an operating voltage of the motor of the motorized brake pressure build-up device, a motor torque of the motor of the motorized brake pressure build-up device, a power consumption of the motor of the motorized brake pressure build-up device, an adjustment path of the at least one adjustable piston of the motorized brake pressure build-up device, controller state information about a possibly executed brake pressure control or a possibly executed driving dynamics control, at least one temperature at and/or in at least the motorized brake pressure build-up device, a pumping rate of the at least one pump used in the brake system, a transmission efficiency of a transmission of the brake system connected to the motorized brake pressure build-up device, at least one switching state of at least one valve of the brake system, a braking force applied to the vehicle by means of the brake system, a braking torque applied to the vehicle by means of the brake system, a steering angle of the vehicle, a yaw rate of the vehicle, a vehicle deceleration applied to the vehicle by means of the brake system, a longitudinal speed of the vehicle, a lateral speed of the vehicle, a lateral acceleration of the vehicle and/or an on-board power supply voltage of an on-board power supply of the vehicle can be ascertained as the at least one second variable. Thus, the embodiment of the prediction method according to the present invention described here can be implemented without extending the sensors that are conventionally already installed on the vehicle.

As an advantageous further development of the prediction method of the present invention, value groups can be ascertained that, in addition to the at least one first variable and the at least one second variable, also comprise at least one third variable, wherein the at least one third variable is ascertained simultaneously with the at least one first variable and the at least one second variable of the same value group and represents an environmental parameter. Since the braking behavior of the vehicle is frequently also affected by environmental conditions, taking at least one environmental parameter into account can further improve the prediction made using the prediction method.

For example, the at least one third variable that can be ascertained is a friction coefficient of a road on which the vehicle is simultaneously traveling, a road inclination angle, a windshield wiper status and/or an outside temperature. The examples listed here for the at least one environmental parameter can also generally be determined without extending the sensors that are conventionally already installed on the vehicle.

BRIEF DESCRIPTION OF THE DRAWINGS

Further features and advantages of the present invention will be explained in the following with reference to the figures.

DETAILED DESCRIPTION OF EXAMPLE EMBODIMENTS

Figure 1A:
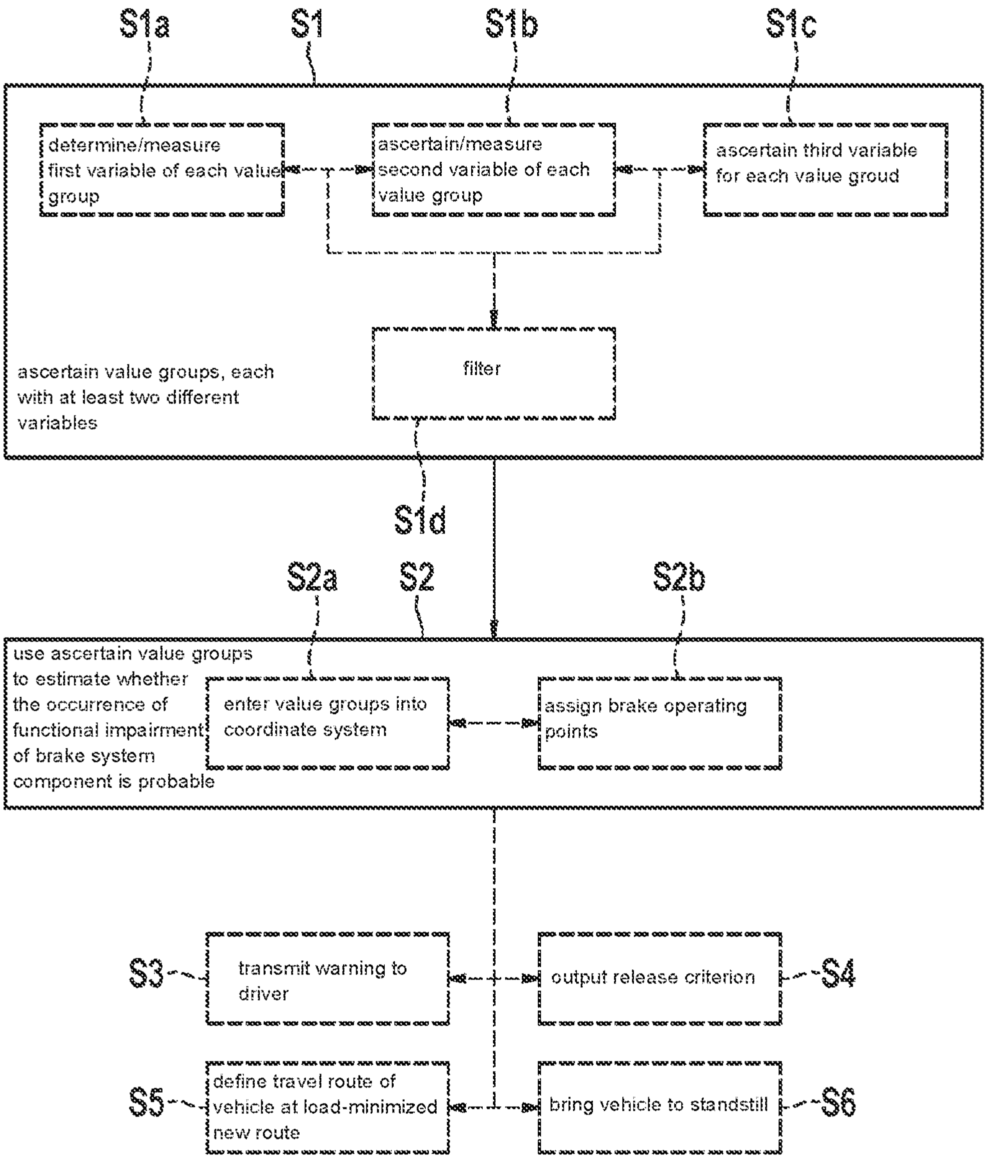
FIG. 1A to 1H show a flow chart and coordinate systems for explaining a first embodiment of the prediction method for at least one brake system component of a brake system of a vehicle, according to the present invention.
Figure 1B:
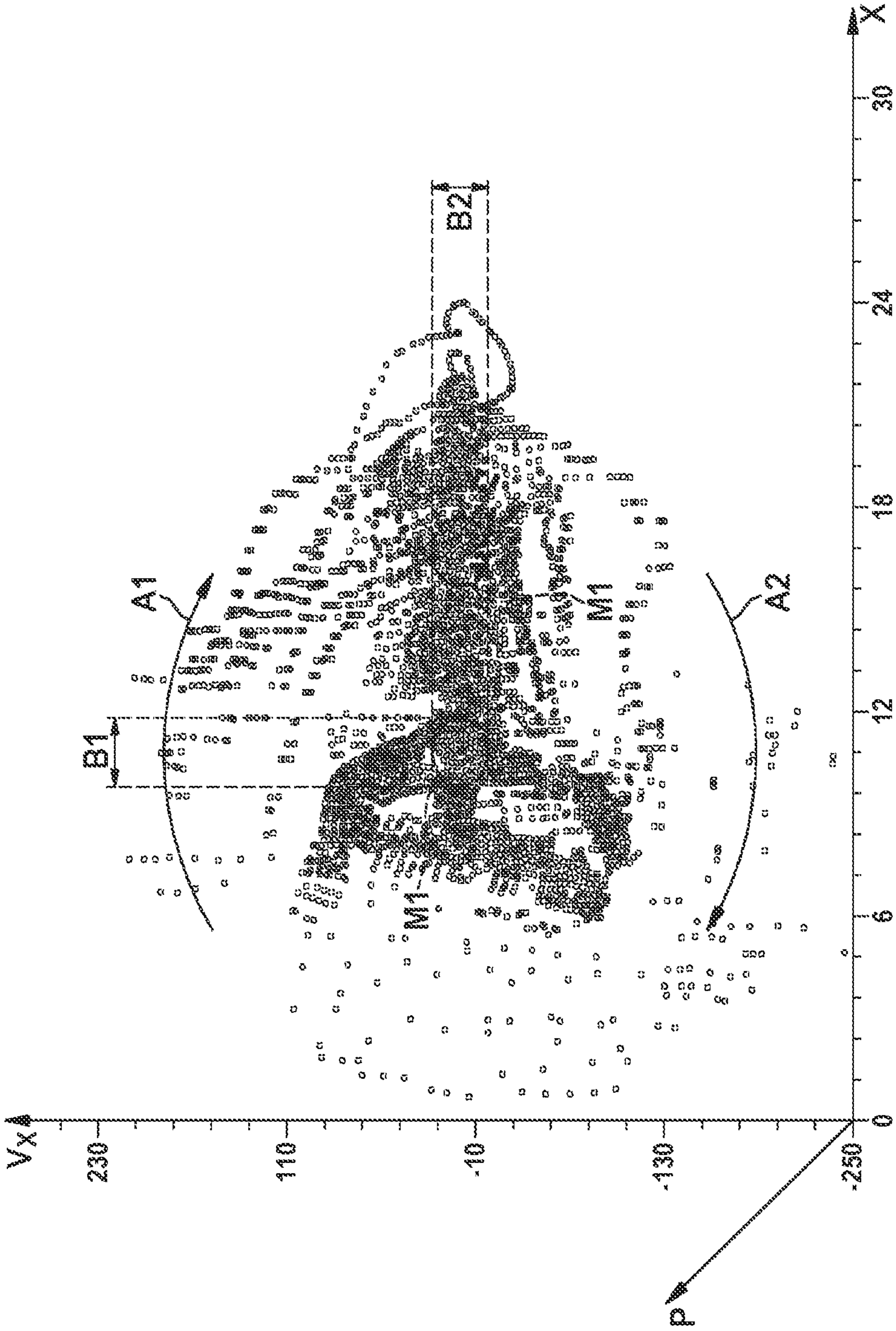
Figure 1C:
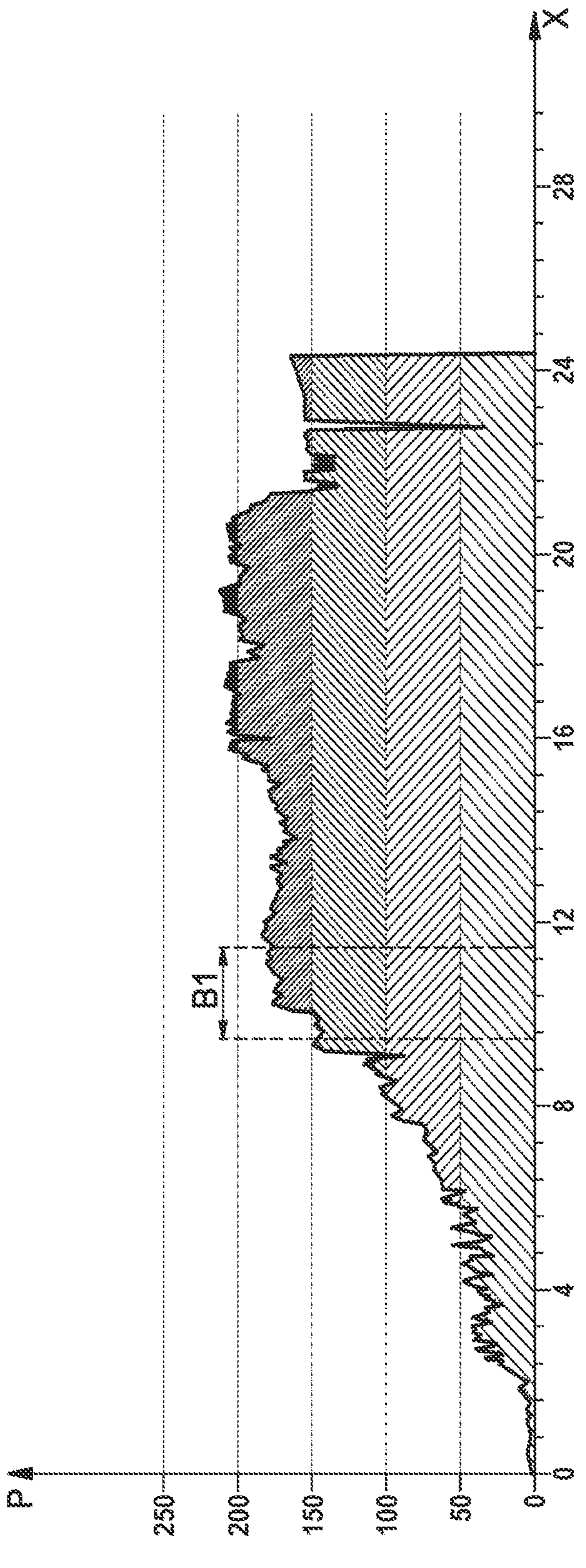
Figure 1D:
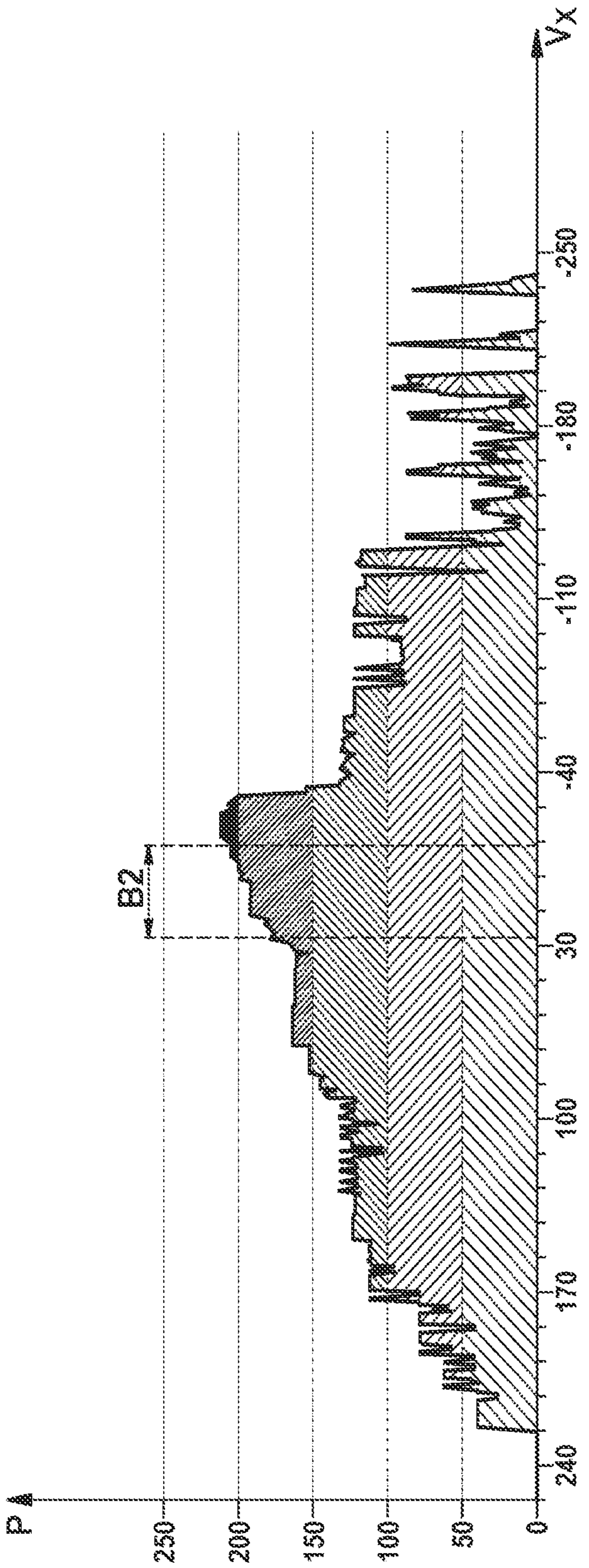
Figure 1E:
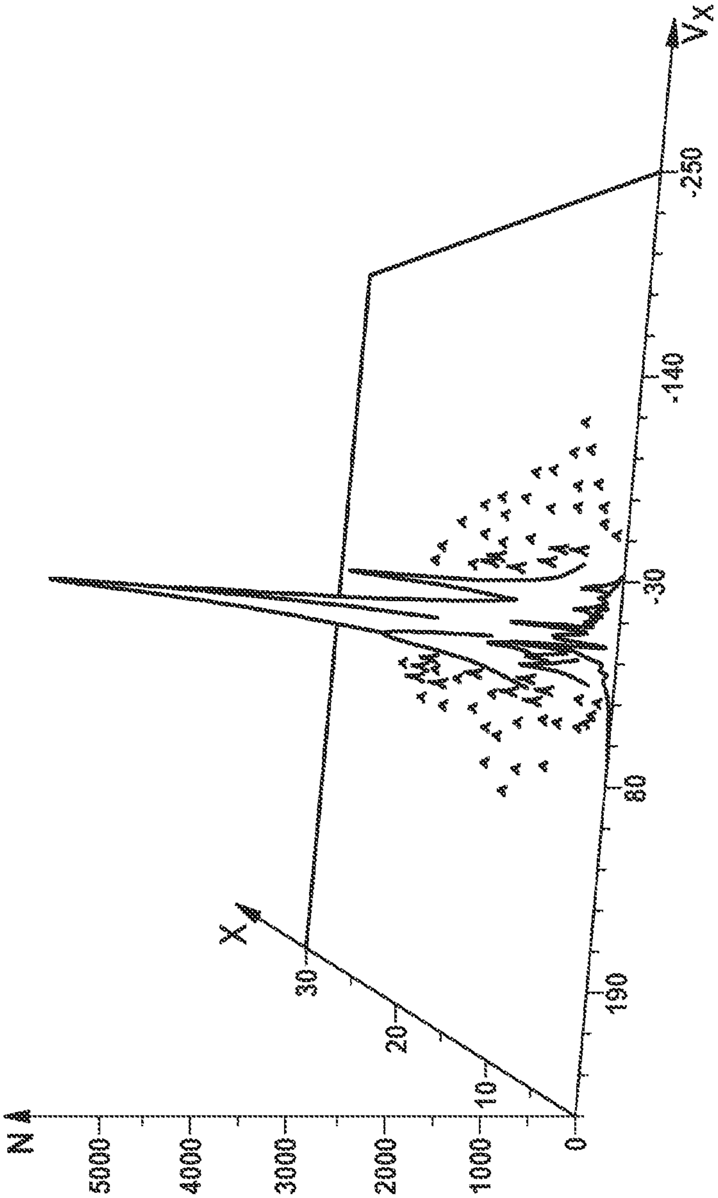
Figure 1F:
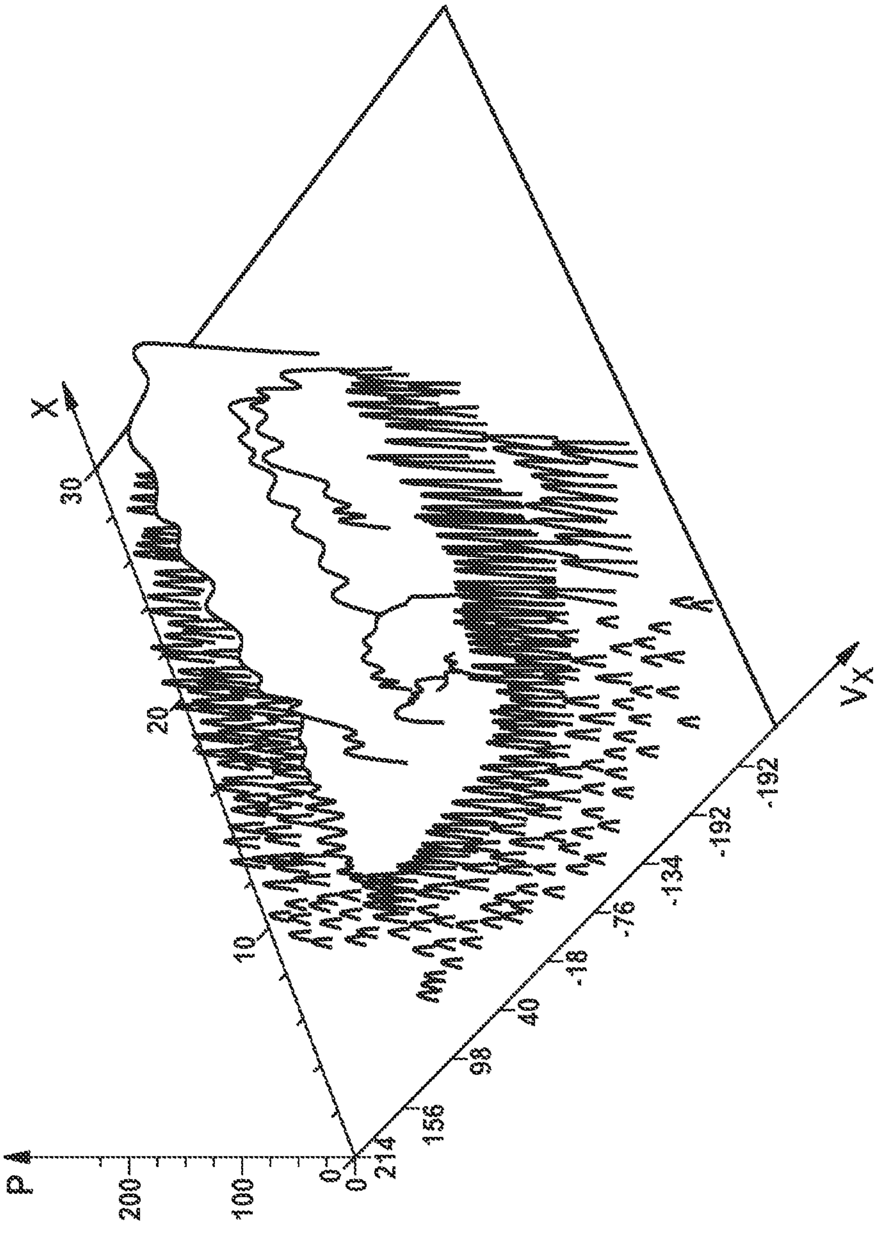
Figure 1G:
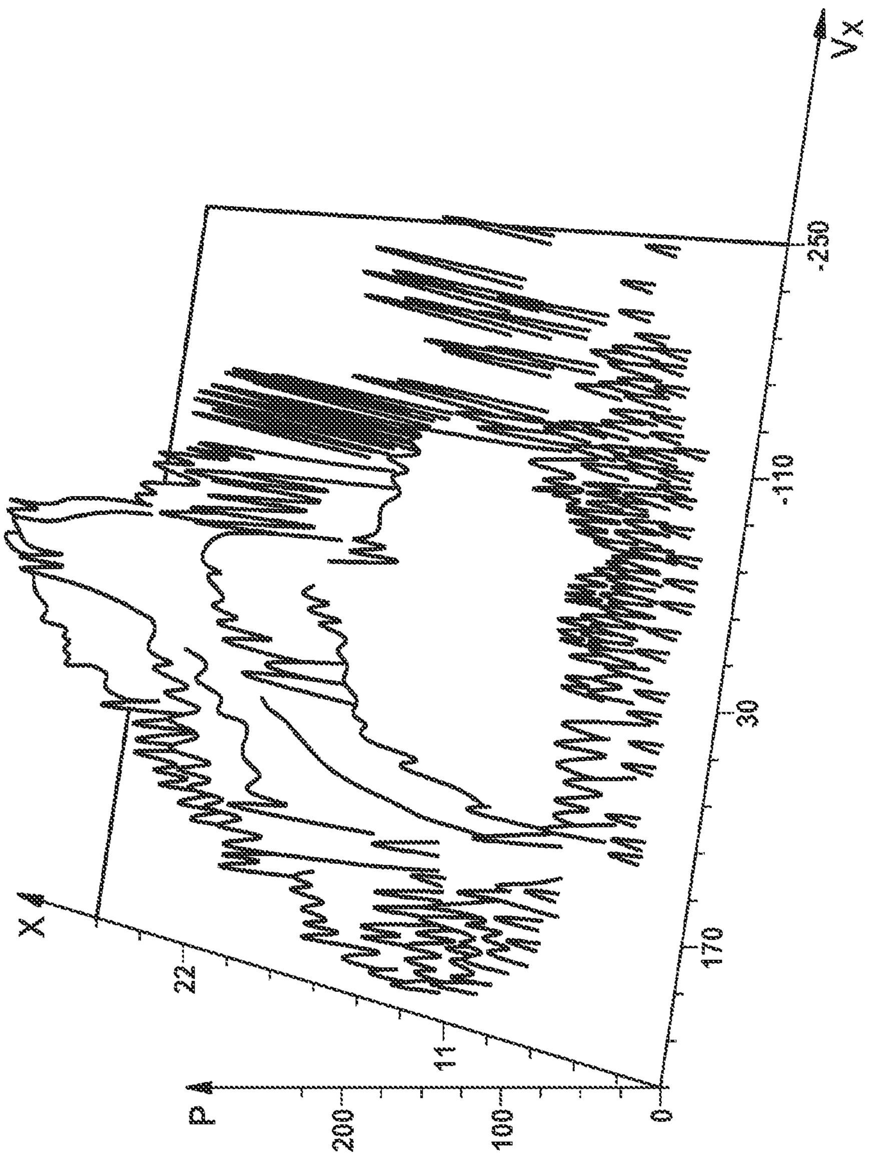
Figure 1H:
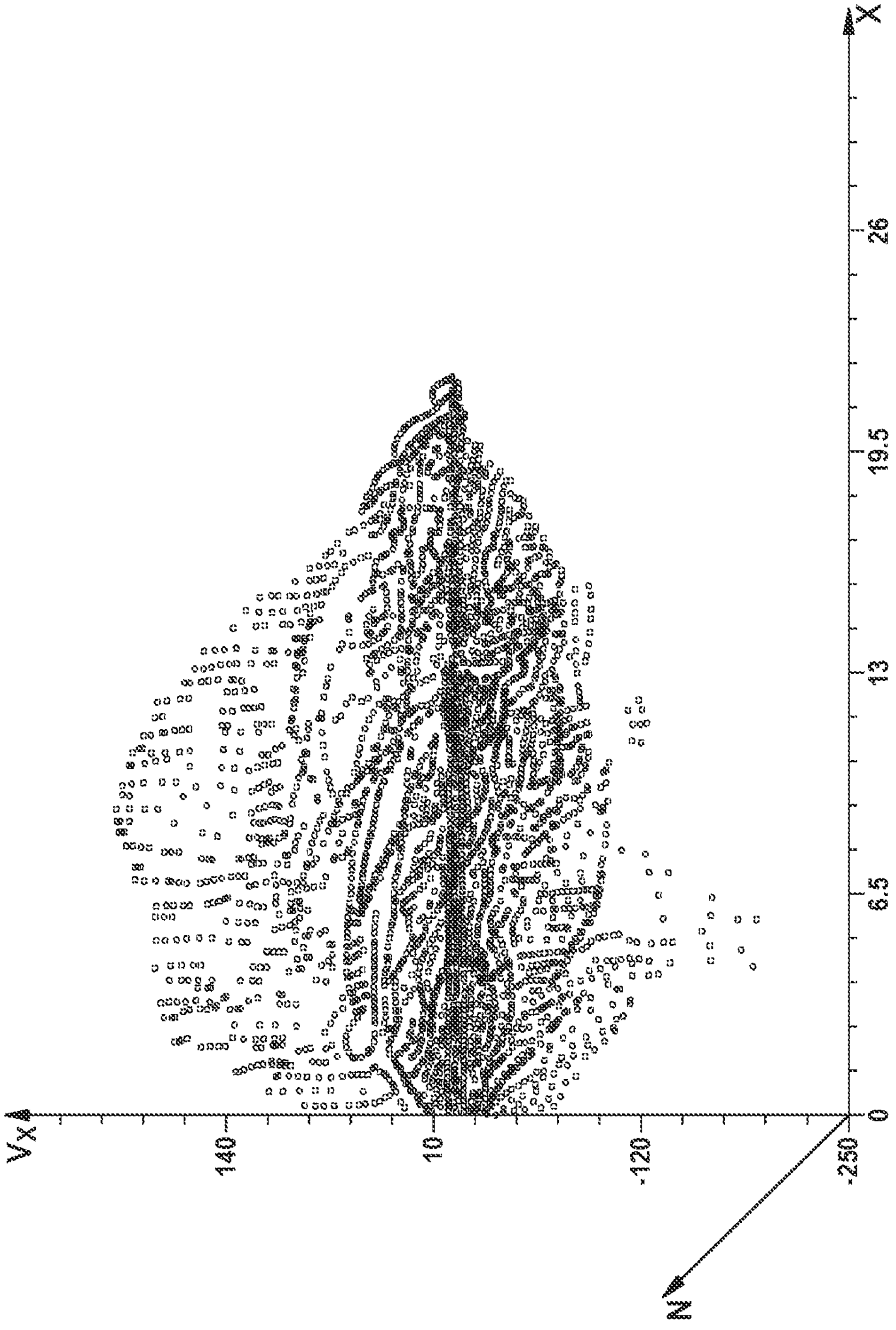

FIG. 1A to 1H show a flow chart and coordinate systems for explaining a first embodiment of the prediction method for at least one brake system component of a brake system of a vehicle.

The prediction method described below can be used for a large number of different types of brake systems. The prediction method described below can also be executed for a brake-by-wire brake system. It is expressly pointed out that the ability to execute the prediction method is also not limited to a specific vehicle type/motor vehicle type of the vehicle/motor vehicle equipped with the respective brake system.

In a method step S1 of the prediction method, value groups of in each case at least two different variables x, $v_x$ and p are ascertained during at least one driver-induced and/or autonomous braking process of the vehicle. The value groups can be ascertained either during an actively executed driving dynamics control or during non-execution of a driving dynamics control. The driving dynamics control can be understood as a control requested by a controller, such as an ABS control (anti-lock brake system control), an ESP control (electronic stability control), a TCS control (traction control system) or an ACC control (adaptive cruise control).

It is expressly pointed out that the at least two different variables x, $v_x$ and p of the same value group are ascertained simultaneously. In addition, the value groups defined in the method step S1 are ascertained in a braking situation in which at least one of the variables x, $v_x$ and p lies outside its respective specified normal value range and/or a temporal derivative of at least one of the variables x, $v_x$ and p lies outside a quasi-static range respectively specified in each case for the respective variable x, $v_x$ and p. This can also be described as the value groups defined in the method step S1 being defined in a braking situation with a high and/or dynamic load.

With the value groups defined in the method step S1, at least one first variable x and $v_x$ of the at least two variables x, $v_x$ and p of each value group in each case represents a brake pedal actuation by a driver of the vehicle and/or a brake request specification from an automatic brake or drive control system and/or the controller of the vehicle. The at least one first variable x and $v_x$ can be understood in particular as a variable/unit that indicates an actuation strength of the brake pedal actuation by the driver and/or a braking strength of the brake request specification from the automatic brake or drive control system and/or the controller. The automatic brake or drive control system can be understood as an automatic system for autonomously controlling at least the speed of the vehicle, such as, for example, adaptive cruise control (ACC). Optionally, the automatic brake or drive control system can also be an automatic system for controlling autonomous braking processes of the vehicle (such as an emergency brake system) or an automatic system for autonomous (driverless) driving of the vehicle. Examples of the controller are given above.

The at least one first variable x and $v_x$ of each value group can be determined/measured in an optional substep S1*a* of the method step S1. In the example of FIGS. 1A to 1H, the at least one first variable x and $v_x$ are a rod path x of an input rod connected to the brake pedal and an adjustment speed $v_x$ of the input rod. The rod path x can be easily and reliably detected by means of a rod path sensor, for example. The adjustment speed $v_x$ of the input rod can also be easily derived from the rod path x. However, the examples given here for the at least one first variable x and $v_x$ are not to be interpreted as limiting. For example, a target motor current of a motor of a motorized brake pressure build-up device of the brake system requested by the automatic brake or drive control system and/or the controller, a target operating voltage of the motor of the motorized brake pressure build-up device requested by the automatic brake or drive control system and/or the controller, a target motor torque of the motor of the motorized brake pressure build-up device requested by the automatic brake or drive control system and/or the controller, a target power consumption of the motor of the motorized brake pressure build-up device requested by the automatic brake or drive control system and/or the controller, a target adjustment path of at least one adjustable piston of the motorized brake pressure build-up device requested by the automatic brake or drive control system and/or the controller, and/or a target pumping rate of at least one pump used in the brake system requested by the automatic brake or drive control system and/or the controller can also be ascertained as the at least one first variable x and $v_x$ of each value group. All of the examples described here for the at least one first variable x and $v_x$ effectively represent an actuation strength of the brake pedal actuation by the driver or a braking strength of the brake request specification from the automatic brake or drive control system and/or the controller.

Simultaneously with the substep S1*a*, an optional substep S1*b* of the method step S1 can also be executed, in which at least one second variable p of the at least two variables x, $v_x$ and p of each value group is ascertained/measured. The at least one second variable p is to be understood as a variable/unit that in each case represents a response of at least the one brake system component of the brake system to the brake pedal actuation and/or the brake request specification variable, a state on and/or in at the least one brake system component (during the response of at least the one brake system component of the brake system) and/or a physical variable of the vehicle braked by means of the brake system. In the embodiment described here, for example, a master brake cylinder pressure p in a master brake cylinder of the brake system is ascertained as the at least one second variable p. The brake master cylinder pressure p can also be understood as a pre-pressure p of the brake system. For example, a pre-pressure sensor of the brake system can be used to ascertain the brake master cylinder pressure p.

However, alternatively or in addition to the master brake cylinder pressure p, at least one brake pressure in at least one wheel brake cylinder of the brake system, a motor current of the motor of the motorized brake pressure build-up device of the brake system, an operating voltage of the motor of the motorized brake pressure build-up device, a motor torque of the motor of the motorized brake pressure build-up device, a power consumption of the motor of the motorized brake pressure build-up device, an adjustment path of the at least one adjustable piston of the motorized brake pressure build-up device, controller state information about a possibly executed brake pressure control or a possibly executed driving dynamics control, at least one temperature at and/or in at least the motorized brake pressure build-up device, a pumping rate of the at least one pump used in the brake system, a transmission efficiency of a transmission of the brake system connected to the motorized brake pressure build-up device, at least one switching state of at least one valve of the brake system, a braking force applied to the vehicle by means of the brake system, a braking torque applied to the vehicle by means of the brake system, a steering angle of the vehicle, a yaw rate of the vehicle, a vehicle deceleration applied to the vehicle by means of the brake system, a longitudinal speed of the vehicle, a lateral speed of the vehicle, a lateral acceleration of the vehicle and/or an on-board power supply voltage of an on-board power supply of the vehicle can be ascertained as the at least one second variable p. The examples listed here for the at least one second variable p can be measured by means of the sensors that are conventionally already used on every type of vehicle.

As an optional further development, a substep S1*c* of the method step S1 can be executed simultaneously with the substeps S1*a* and S1*b*, by means of which at least one third variable is ascertained for each value group in addition to the at least one first variable x and $v_x$ and the at least one second variable p. The substep S1*c* is executed simultaneously with the substeps S1*a* and S1*b* in such a way that the at least one third variable is ascertained simultaneously with the at least one first variable x and $v_x$ and the at least one second variable p of the same value group. The at least one third variable is to be understood as a variable/unit that represents an environmental parameter. The at least one third variable can be, for example, a friction coefficient of a road on which the vehicle is simultaneously traveling, a road inclination angle, a windshield wiper status and/or an outside temperature. A sensor system suitable for determining the examples listed here for the at least one third variable is thus conventionally already available on many vehicle types/motor vehicle types. To determine the friction coefficient of a road on which the vehicle is simultaneously traveling, location information of the road on which the vehicle is currently traveling can also be ascertained while the other variables x, $v_x$ and p of the same value group are being determined and the friction coefficient of the road on which the vehicle is simultaneously traveling can be read out/interrogated from a specified friction coefficient map using the respective location information.

In order to ensure that the method step S1 can be executed rapidly, the substeps S1*a*, S1*b* and S1*c* are preferably executed once for each value group, without paying attention during the execution of the substeps S1*a* to S1*c* to whether at least one of the ascertained variables x, $v_x$ and p is outside its respective specified normal value range and/or whether a temporal derivative of at least one of the ascertained variables x, $v_x$ and p is outside its respective specified quasi-static range. If necessary, after executing substeps S1*a* to S1*c*, a substep S1*d* of the method step S1 is then executed, in which a previously ascertained value group, with which none of the ascertained variables lies outside their respective specified normal value range and/or no temporal derivative of at least one of the ascertained variables x, $v_x$ and p lies outside its respective specified quasi-static range, is filtered out from the value groups used for the further method steps.

In a further method step S2, the ascertained (and not filtered out) value groups are used to estimate whether the occurrence of at least one functional impairment of at least the one brake system component of the brake system is probable at least during a specified prediction time interval. The method step S2 makes use of the fact that, in particular with a braking situation with a high and/or dynamic load, using the at least one simultaneously ascertained value group, it can be recognized at an early stage whether the at least one brake system component of the brake system used to execute the respective load can no longer fully withstand the stress. Thus, the prediction method described here uses in a targeted manner value groups of at least one braking situation in which, due to the high and/or dynamic load to be managed, even only a slightly reduced functionality is most likely to be recognizable, for the advantageous prediction. In addition, executing the prediction using only the value groups ascertained (and not filtered out) in the method step S1 places lower demands on the electronics used for this purpose and on the data memory that is also used, since the number of value groups evaluated in the method step S2 is comparatively low.

By means of the prediction method described here, the overall functionality of an electromechanical brake booster of the brake system or an integrated plunger device of the brake system (such as an IPB, integrated power brake) in particular can also be examined with regard to a prediction of its future usability/functionality. In particular, this method can also be used to forecast future failures of the electromechanical brake booster or the integrated plunger device, which cannot be predicted using conventional monitoring methods and sensors according to the related art, such as, for example, a motor position sensor or a differential sensor. Thus, the prediction method described here enables an advantageous early diagnosis, in particular for the electromechanical brake booster or the integrated plunger device of the brake system of the vehicle. However, it is expressly pointed out that other brake system components can also be examined with respect to imminent functional impairment/future failure by means of the prediction method.

Preferably, the value groups ascertained in the method step S1 are entered in a substep S2*a* of the method step S2 in a coordinate system that has at least one first axis indicating the at least one first variable x and $v_x$ and at least one second axis indicating the at least one second variable p. If, in the method step S1, value groups are ascertained that, in addition to the at least one first variable x and $v_x$ and the at least one second variable p, also comprise the at least one third variable, the coordinate system can have, in addition to the at least one first axis and the at least one second axis, at least one third axis indicating the at least one third variable. In particular, if a friction coefficient of the road on which the vehicle is simultaneously traveling is ascertained as the at least one third variable for each value group in the method step S1/S1*c*, the coordinate system can also have sectors indicating the friction coefficient in a plane spanned by the or one of the first axis and the or one of the second axis instead of a friction coefficient axis indicating the friction coefficient.

Examples of such coordinate systems are illustrated graphically in FIGS. 1B to 1H, wherein the axes of the coordinate systems of FIGS. 1B to 1H indicate the rod path x of the input rod (in mm/millimeter), the adjustment speed $v_x$ of the input rod (in mm/s, i.e. in millimeters per second), the master cylinder pressure p (in bar) and a frequency N. The coordinate systems of FIGS. 1B to 1E show a braking situation in which, as illustrated graphically by means of an arrow A1, there is a sudden change from partial braking to ABS control, wherein a change suddenly occurs between a low friction coefficient of the road being traveled on (marked with a marking M1) and a high friction coefficient of the road being traveled on (marked with a marking M2). Thus, the braking situation is highly dynamic until partial braking can be resumed, as illustrated graphically by means of the arrow A2. Thus, the braking situation is well suited for predicting whether, with high probability, the occurrence of at least one functional impairment in at least the one brake system component of the brake system is imminent, at least during the specified prediction time interval. As indicated graphically by means of the regions B1 and B2 marked in the coordinate systems of FIGS. 1B to 1D, the value groups that are most likely to indicate a reduced functionality, even if only slightly, of at least the one brake system component of the brake system can be selected in a targeted manner. Thus, memory requirements needed to evaluate such value groups and the work required are minimal. By finding a "worst-case maneuver" with respect to the load acting on at least one brake system component of the brake system, not only can the quality of the prediction be improved, but the amount of work and memory required to execute the prediction can also be significantly reduced.

In a further optional substep S2*b* of the method step S2, brake operating points can be assigned in each case to the value groups entered in the coordinate system. (However, for the sake of clarity, no brake operating points are marked in the coordinate systems of FIGS. 1B to 1H) Subsequently, taking additional account of the distribution of the brake operating points, it is possible to estimate whether the occurrence of at least one functional impairment is probable in at least the one brake system component of the brake system, at least during the specified prediction time interval. It is expressly pointed out that a brake operating point can be assigned to each overall system status, in particular depending on environmental data, road data and/or traffic situation data. If the position of the respective brake operating point in the respective coordinate system now deviates from a target position specified for the specific braking operation, this indicates a decreasing functionality of at least the one brake component of the brake system. Transitions from a first brake operating point to a second brake operating point, for example when the driver brakes during the transition from a dry road to snow, can also be detected and evaluated accordingly. Thus, the additional evaluation of the brake operating points enables a transient and highly dynamic early diagnosis for the respective brake system. The substep S2*b* also provides a "learning model," in which new (i.e., previously unknown) brake operating points can be detected and stored in a brake characteristic diagram including state transitions. These new brake operating points can then be assessed for anomalies in the system network. The brake characteristic diagram used for prediction/early diagnosis can be distance-related, position-related, speed-related and/or energy-related.

Thus, the prediction method described here is a highly sensitive way of recognizing faults or functional impairments in the respective brake system at an early stage. Advantageously, the coordinate system created in each case can be used to reliably predict whether a still functional brake system component of the brake system will at best have limited functionality in the near future. In particular, "incipient faults" in the brake system can be recognized/predicted using the coordinate system created in each case. Particularly in a braking situation with a high and/or dynamic load, wear of at least the one brake system component of the brake system, which manifests itself in a change in the frictional behavior of at least one of its components, can be derived from the energy consumption required to fulfill the brake request of the driver, the automatic brake or drive control system and/or the controller, but which deviates from the model prediction. Gradual aging of at least the one brake system component of the brake system can also be recognized by regularly storing data, for example, depending on the mileage. By regularly storing the created coordinate systems, for example, depending on the mileage, additional reference data can be secured for later early diagnosis. In addition, the driving behavior of the driver can also be taken into account in the prediction. Nevertheless, the method steps S1 and S2 to be executed for this purpose can be executed using comparatively inexpensive and relatively low-volume electronics.

In particular, if it is predicted/forecast in the method step S2 that the occurrence of at least one functional impairment is probable in at least the one brake system component of the brake system during the prediction time interval, a corresponding warning can be transmitted to the driver of the vehicle as an optional method step S3 by means of a light display, by means of a sound output and/or by means of an image display. At least one light element of the vehicle, a sound output device of the vehicle, an image display device of the vehicle and/or a mobile device of the driver, in particular his cell phone, can be used to transmit the warning. Thus, the driver can be prompted to visit a workshop in a variety of ways. Alternatively or in addition, service information corresponding to the prediction can also be sent to the workshop in the method step S3.

However, if it is predicted/forecast in the method step S2 that no occurrence of at least one functional impairment in at least the one brake system component of the brake system is to be feared during the prediction time interval, an optional method step S4 can also be used to output a release criterion for autonomous driving of the vehicle. Accordingly, if it is predicted/forecast in the method step S2 that the occurrence of at least one functional impairment is probable in at least the one brake system component of the brake system during the prediction time interval, the release criterion for autonomous driving of the vehicle can be deactivated. In this case, the automatic system used for autonomous driving of the vehicle is preferably designed in such a way that the automatic system is switched to an operating mode suitable for autonomous driving of the vehicle only when the release criterion is present. This ensures that the vehicle is only put into autonomous driving mode if a functional impairment of its brake system can be ruled out with a high degree of probability for at least the probable duration of autonomous driving.

In another optional method step S5, after recognizing that the occurrence of at least one functional impairment is probable in at least the one brake system component of the brake system at least during the specified prediction time interval, a travel route of the vehicle can also be defined at a load-minimized new route. Likewise, a driving mode of the vehicle can be adjusted accordingly so that a load minimization is achieved while the vehicle continues to travel, for example by degrading functions and/or adjusting parameterizations, as a result of which at least one brake system component of the brake system is better protected while the vehicle continues to travel. In this way, the point in time at which at least the functional impairment of at least the one brake system component actually occurs can be at least slightly delayed.

Furthermore, as an optional method step S6, after recognizing that the occurrence of at least one functional impairment is probable in at least the one brake system component of the brake system at least during the specified prediction time interval, the vehicle can also be brought to a standstill. In particular, after recognizing a critical anomaly on at least the one brake system component of the brake system, the vehicle can be forced to stop. This improves the safety standard of the vehicle.

Figure 2A:
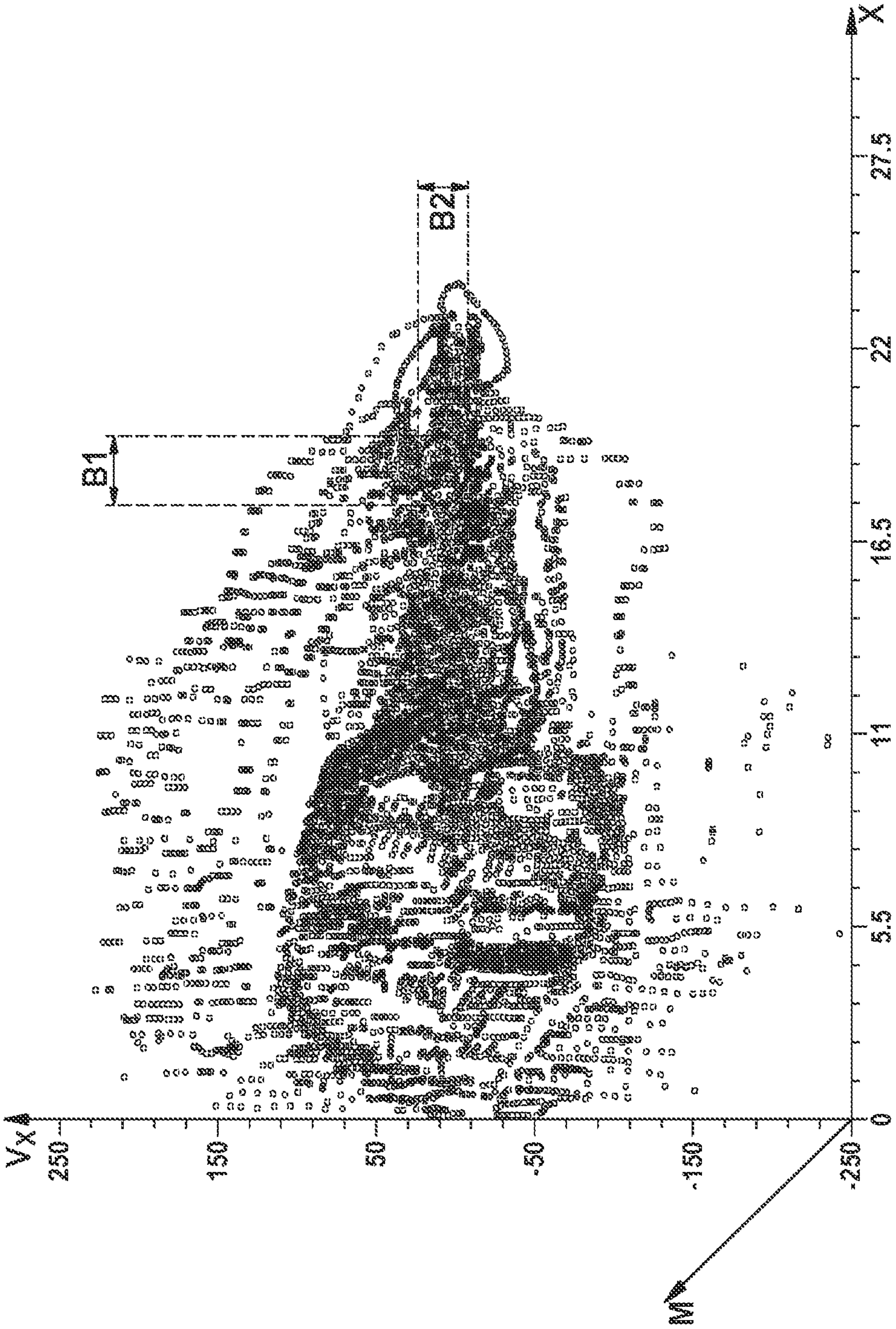
FIG. 2A to 2C show coordinate systems for explaining a second embodiment of the prediction method for at least one brake system component of a brake system of a vehicle, according to the present invention.
Figure 2B:
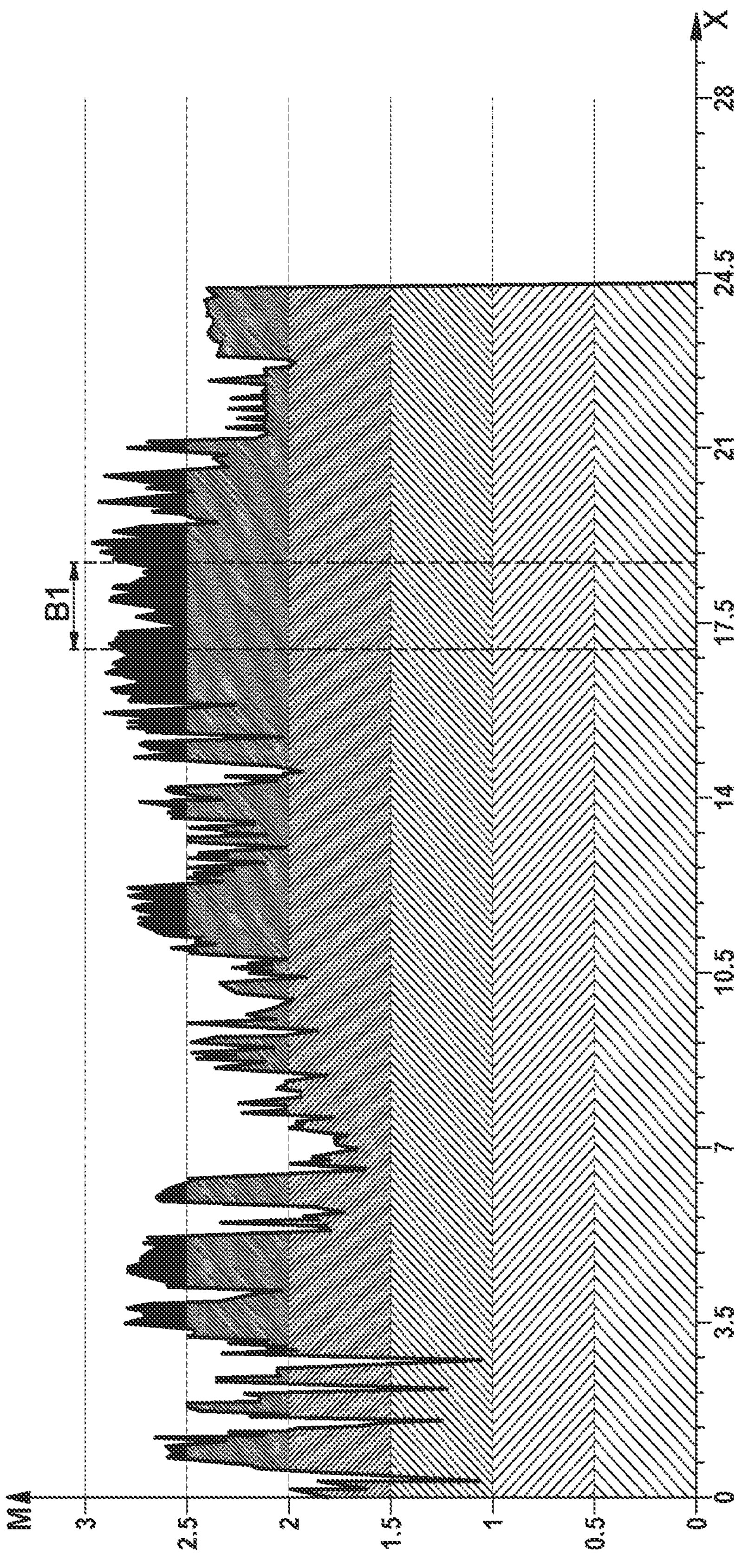
Figure 2C:
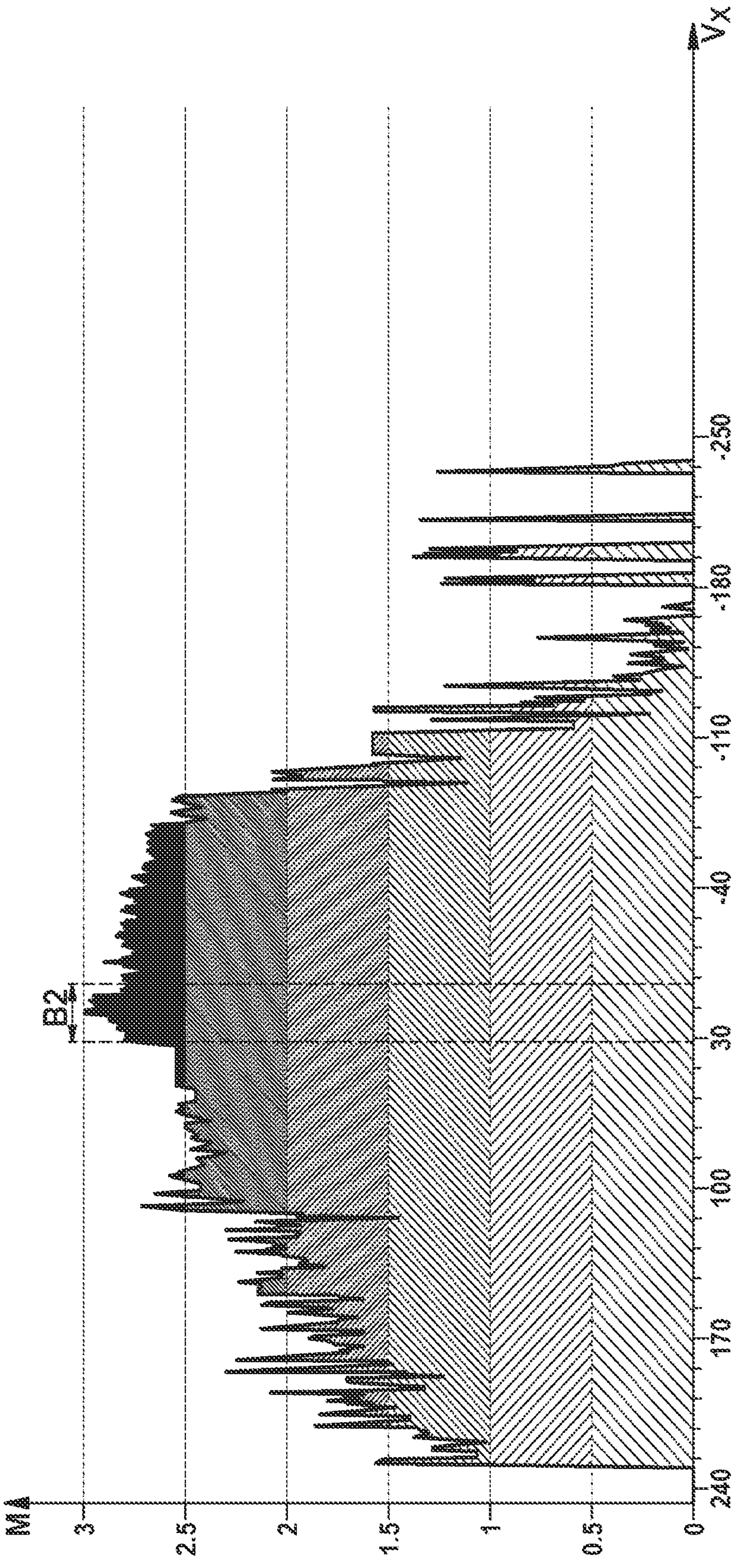
Figure 3A:
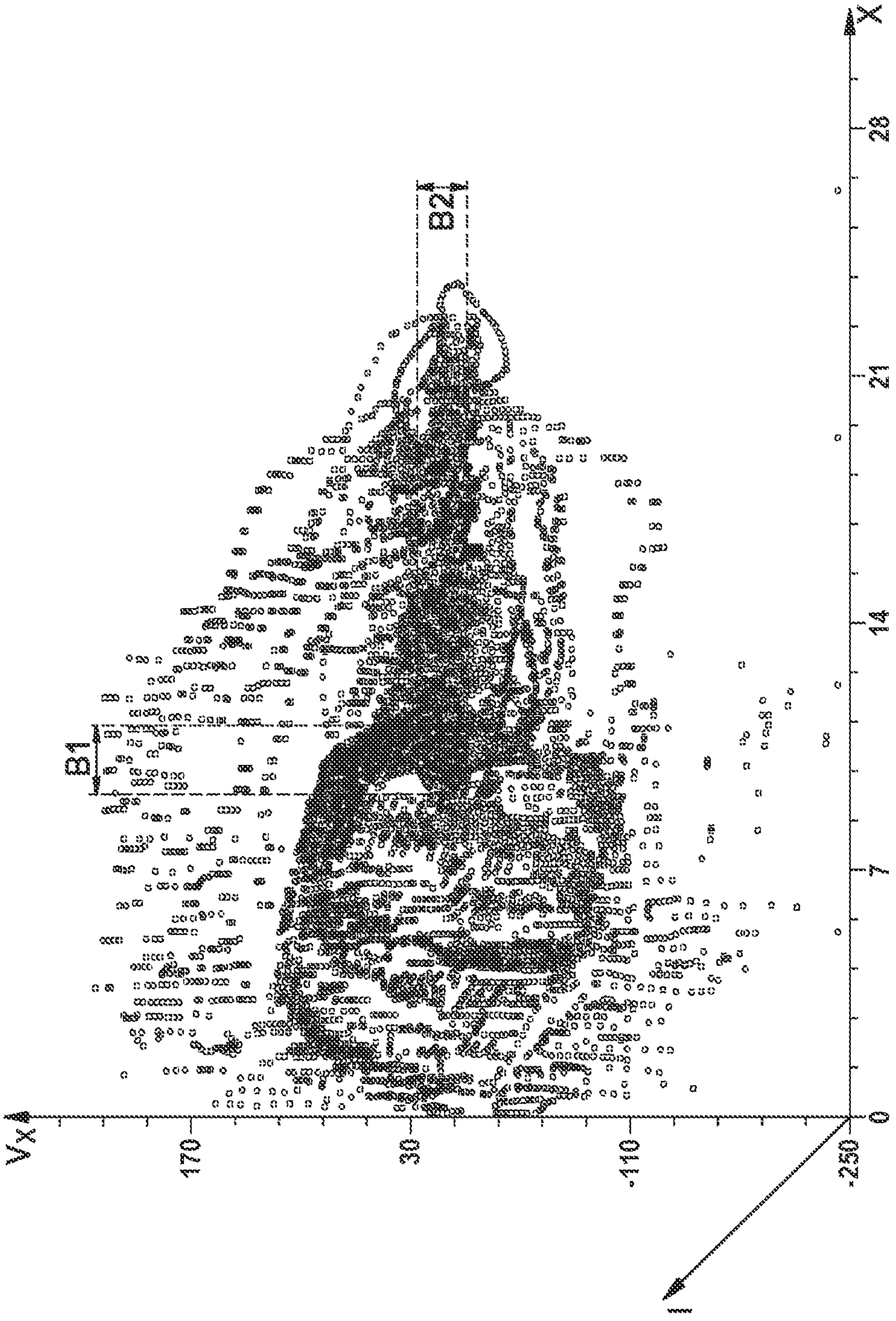
FIG. 3A to 3E show coordinate systems for explaining a third embodiment of the prediction method for at least one brake system component of a brake system of a vehicle, according to the present invention.
Figure 3B:
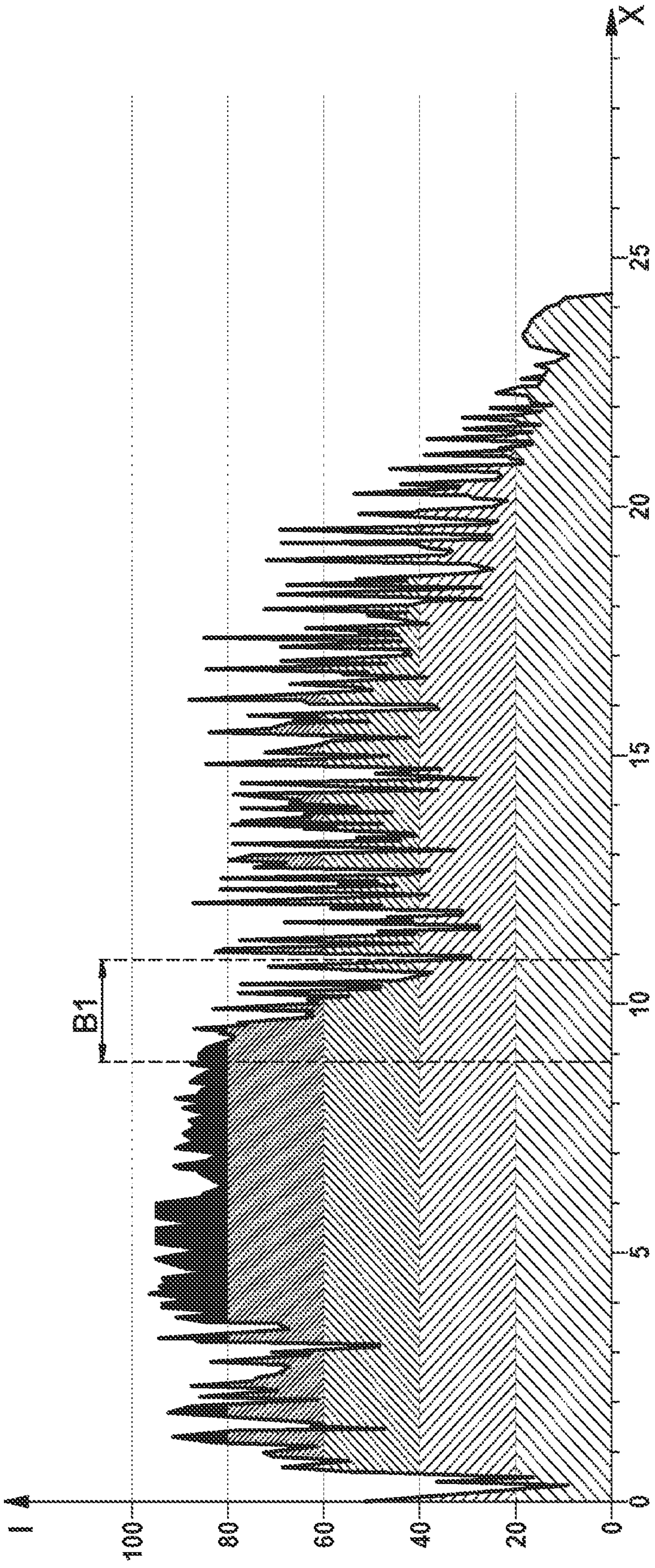
Figure 3C:
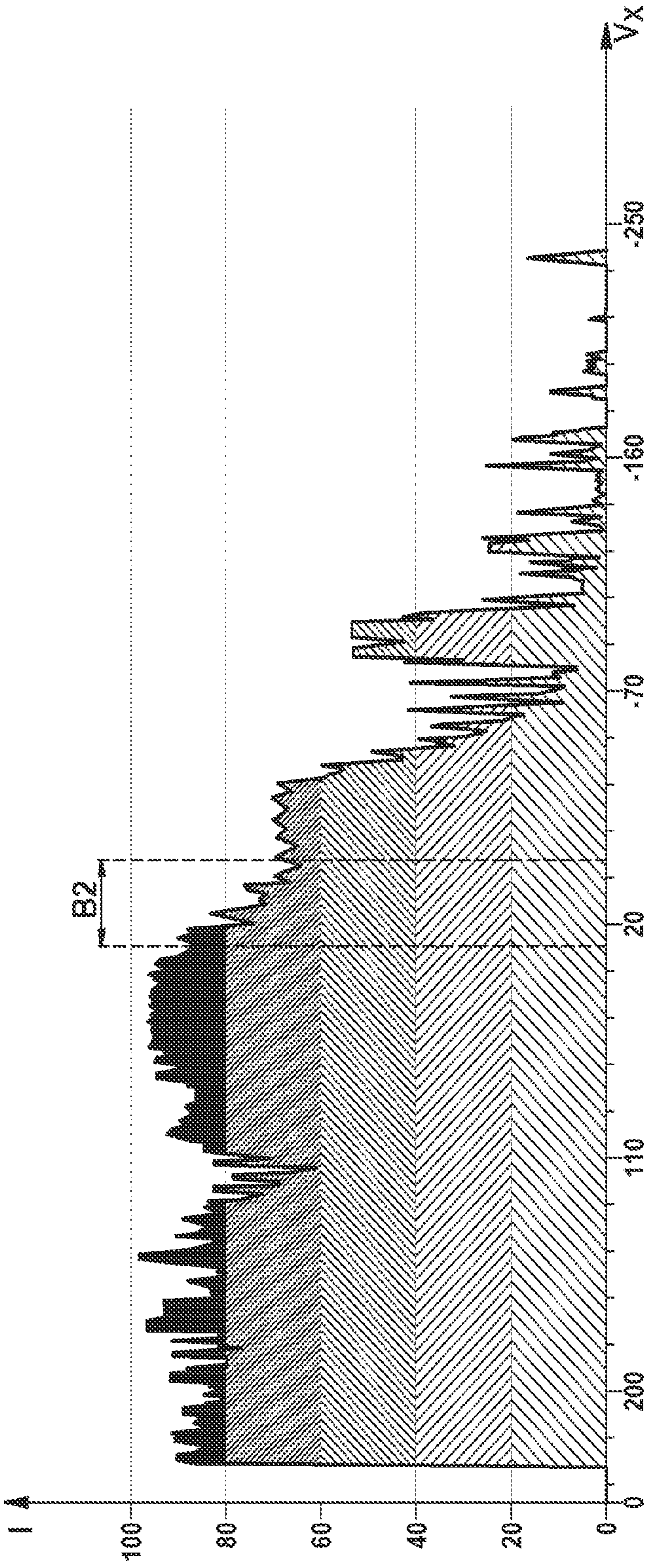
Figure 3D:
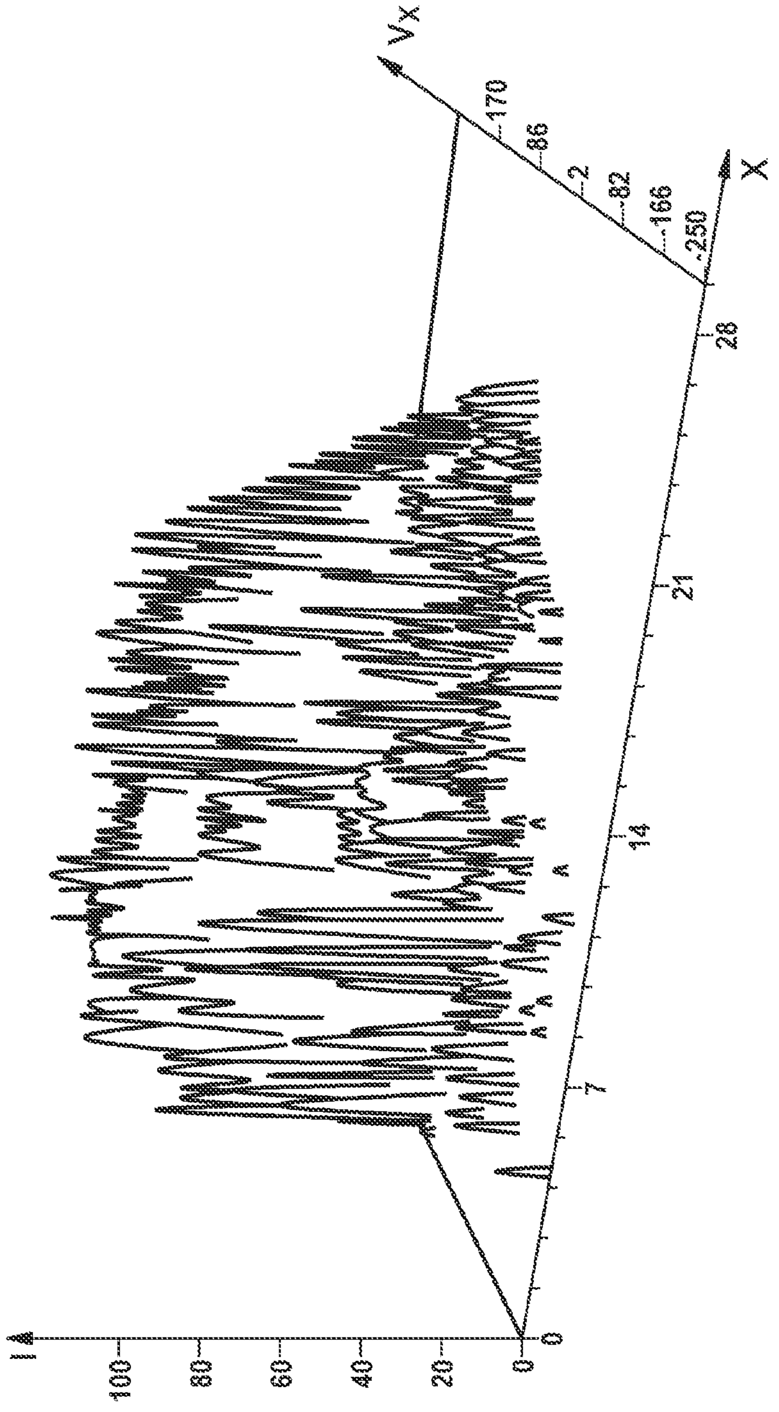
Figure 3E:
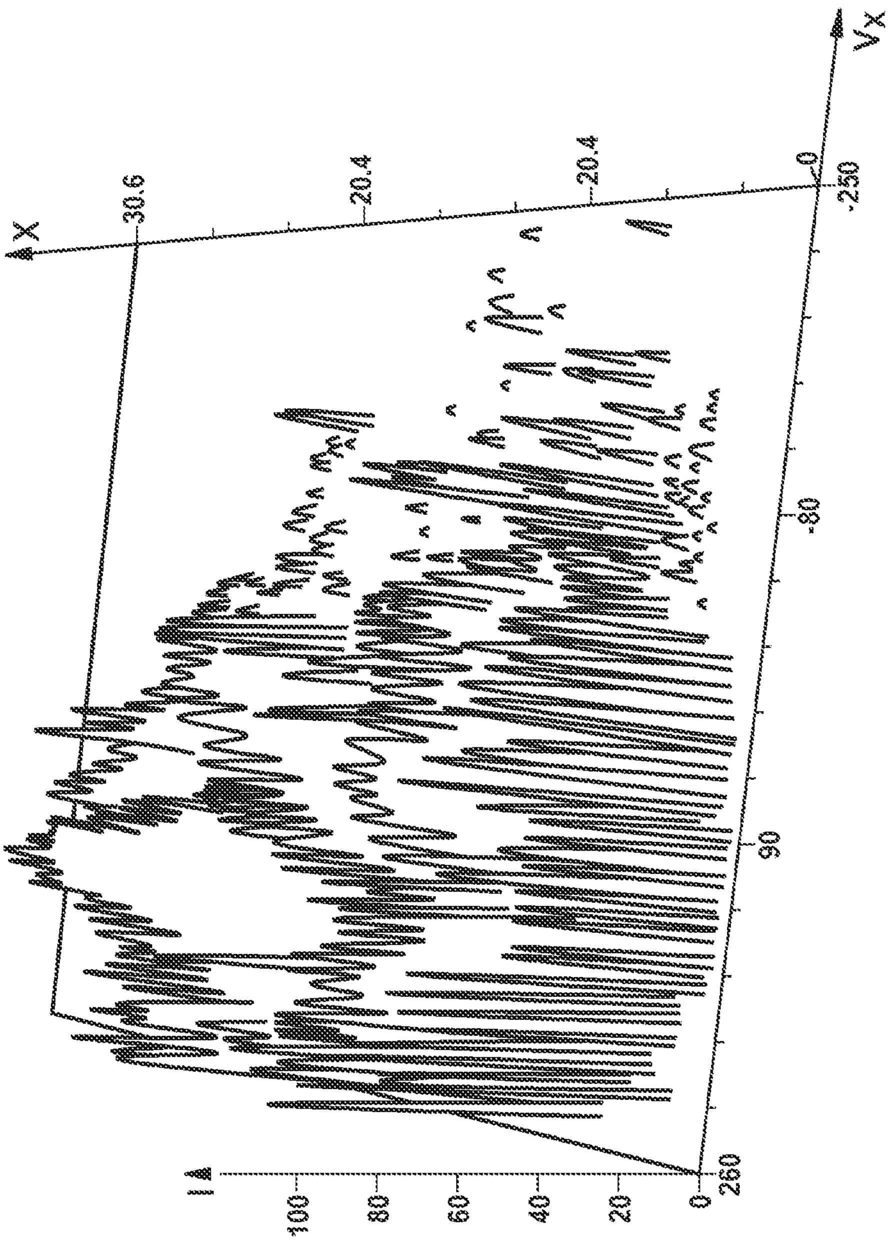

FIGS. 2A to 2C show coordinate systems for explaining a second embodiment of the prediction method for at least one brake system component of a brake system of a vehicle.

The prediction method illustrated by means of the coordinate systems of FIGS. 2A to 2C differs from the previously described embodiment only in that the at least one second variable M is a braking torque M (in Nm, i.e. in Newton meters) applied to the vehicle by the brake system together with the rod path x of the input rod (in mm/millimeter) and the adjustment speed $v_x$ of the input rod (in mm/s, i.e. in millimeters per second) and is evaluated in the manner already explained above.

As indicated graphically by means of the regions B1 and B2 marked in the coordinate systems of FIGS. 2A to 2C, the value groups that are most likely to indicate a reduced functionality, even if only slightly, of at least the one brake system component of the brake system can also be selected in a targeted manner in this case.

FIGS. 3A to 3E show coordinate systems for explaining a third embodiment of the prediction method for at least one brake system component of a brake system of a vehicle.

In contrast to the embodiments described above, with the prediction method shown by means of FIGS. 3A to 3E, a motor current I of a motor of the brake system (in A/ampere) is determined as the at least one second variable I together with the rod path x of the input rod (in mm/millimeter) and the adjustment speed $v_x$ of the input rod (in mm/s, i.e. in millimeters per second) and is evaluated in the manner already explained above. In this embodiment, it is also possible to select in a targeted manner the value groups that are most likely to indicate a reduced functionality, even if only slightly, of at least the one brake system component of the brake system, as is again indicated by means of the marked regions B1 and B2.

Figure 4:
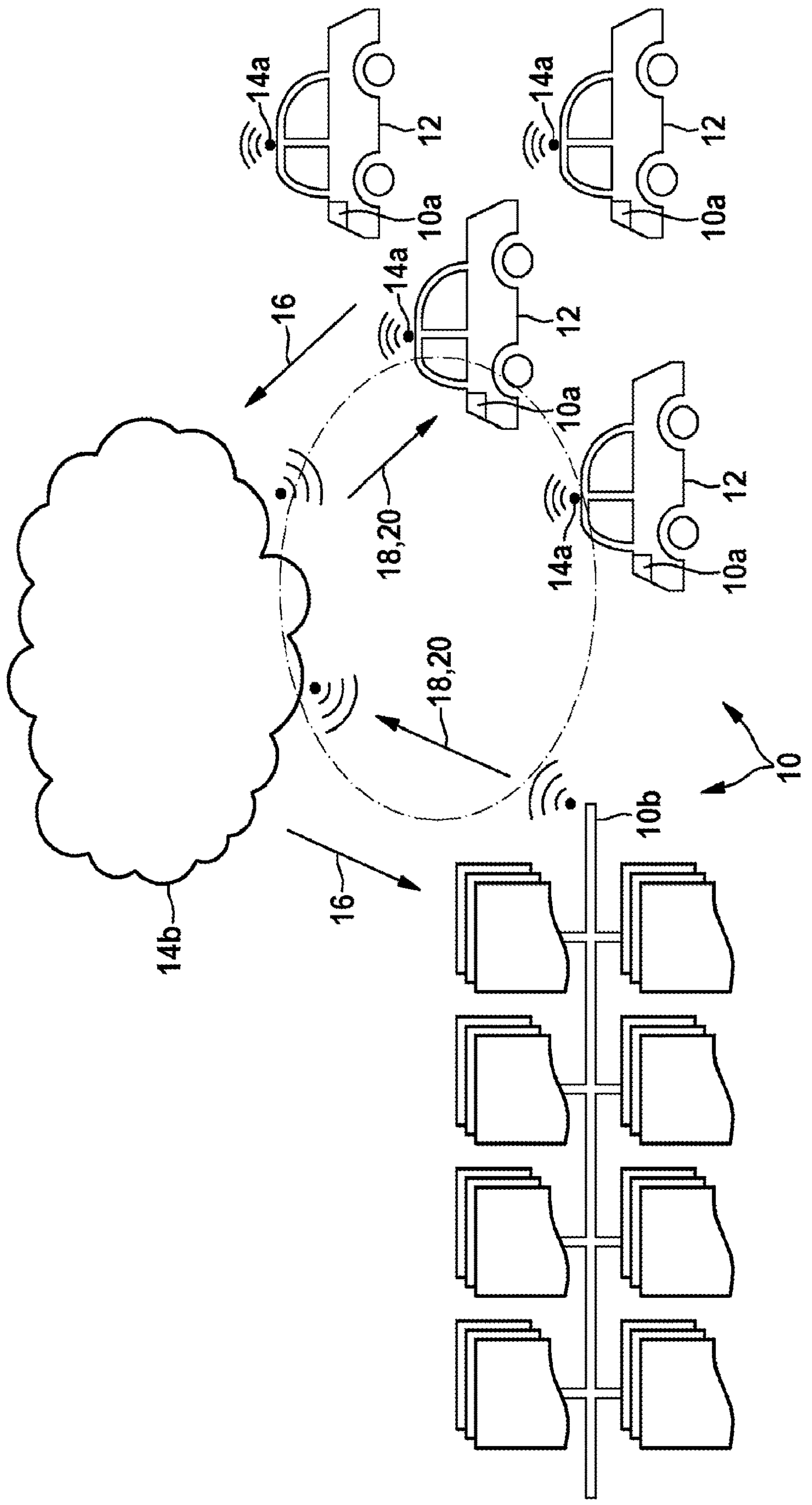
FIG. 4 shows a schematic representation for explaining a mode of operation of an embodiment of the prediction system for at least one brake system component of a brake system of a vehicle, according to the present invention.

FIG. 4 shows a schematic representation to explain a mode of operation of an embodiment of the prediction system for at least one brake system component of a brake system of a vehicle.

The prediction system 10 described below can be used for prediction, in particular for early diagnosis, for at least one brake system component of a brake system of a vehicle 12. The usability of the prediction system 10 described below is neither limited to a specific brake system type of the respective brake system nor to a specific vehicle type/motor vehicle type of the vehicle/motor vehicle 12 equipped with the respective brake system.

The prediction system 10 comprises a first electronic device 10*a*, which is designed and/or programmed to ascertain value groups of in each case at least two different variables during at least one driver-induced and/or autonomous braking process. In addition, at least two variables of the same value group can be/are ascertained simultaneously by means of the first electronic device. Likewise, the at least two variables for each value group can be/are ascertained in a braking situation in which at least one of the variables lies outside its respective specified normal value range and/or a temporal derivative of at least one of the variables lies outside a quasi-static range respectively specified for the respective variable. Thus, the value groups are all determined in at least one braking situation with a high and/or dynamic load.

At least one first variable of the at least two variables in each case represents a brake pedal actuation by a driver of the vehicle and/or a brake request specification from an automatic brake or drive control system and/or a controller of the vehicle, while at least one second variable of the at least two variables in each case represents a response of at least the one brake system component of the brake system to the brake pedal actuation and/or the brake request specification variable, a state at and/or in at least the one brake system component and/or a physical variable of the vehicle braked by means of the brake system. As an advantageous further development, the first electronic device can additionally be designed and/or programmed to ascertain value groups that, in addition to the at least one first variable and the at least one second variable, also comprise at least one third variable, wherein the at least one third variable is ascertained simultaneously with the at least one first variable and the at least one second variable of the same value group and represents an environmental parameter. In particular, the environmental parameter can be a friction coefficient of a road on which the vehicle 12 is simultaneously traveling. Further examples of the at least one first variable, the at least one second variable and the at least one third variable are already listed above.

In addition, the first electronic device 10*a* and/or a second electronic device 10*b* of the prediction system 10 are designed and/or programmed to, using the ascertained value groups, estimate whether the occurrence of at least one functional impairment of at least the one brake system component of the brake system is probable at least during a specified prediction time interval. This means that the prediction system 10 described here also offers the advantages explained above.

In particular, the first electronic device 10*a* and/or the second electronic device 10*b* can be designed and/or programmed to enter the value groups into a coordinate system with at least one first axis indicating the at least one first variable and at least one second axis indicating the at least one second variable. In addition to the at least one first axis and the at least one second axis, the coordinate system can also comprise at least one third axis indicating at least one third variable. In particular, the coordinate system can have a friction coefficient axis or sectors indicating the friction coefficient in a plane spanned by the or one of the first axes and the or one of the second axes. As an advantageous further development, the first electronic device 10*a* and/or the second electronic device 10*b* can additionally be designed and/or programmed to assign brake operating points to the value groups entered in the coordinate system in each case and to estimate, taking additional account of the distribution of the brake operating points, whether the occurrence of at least one functional impairment is probable in at least the one brake system component of the brake system, at least during the specified prediction time interval. The prediction system 10, i.e. its first electronic device 10*a* and/or its second electronic device 10*b*, can in particular be designed/programmed to execute the method steps explained above.

In the example of FIG. 4, the first electronic device 10*a* can be/is mounted on the respective vehicle 12. In addition, the first electronic device 10*a* is designed/programmed to control a first communication device 14*a* of the first electronic device 10*a* or of the vehicle equipped with the first electronic device 10*a* to transmit data 16 comprising the ascertained value groups and/or at least one coordinate system with the ascertained value groups to a second communication device 14*b* of the second electronic device 10*b*, which is separate from the vehicle 12. The second communication device 14*b* is then designed to receive the data 16 transmitted by the first communication device 14*a*. In addition, information stored on the second electronic device 10*b*, such as a friction coefficient map and/or weather information, can also be made available to the first electronic device 10*a* via the communication devices 14*a* and 14*b*.

The first electronic device 10*a* can also be designed/programmed to create a preliminary prediction and, in particular if unknown or suspicious operating points are present in the created coordinate system, transmit the data 16 with the preliminary prediction to the second electronic device 10*b*. After receiving the data 16, the second electronic device 10*b* creates the prediction/early diagnosis for at least one brake system component of the brake system with at least the ascertained value groups in the manner already explained above. For this purpose, vehicle models, characteristic diagrams and/or information about worst-case maneuvers and their consequences can be stored on the second electronic device 10*b*.

Prediction information 18 determined by the second electronic device 10*b* can then be sent back to the vehicle 12 via the communication devices 14*a* and 14*b*. The prediction information 18 can in particular comprise commands 20, which then trigger at least one of the method steps S3 to S6 already explained above on the vehicle 12.

Thus, the second electronic device 10*b* can still execute the advantageous prediction/early diagnosis even if there is a relatively large distance between it and the vehicle 12. Thus, the interaction of the second electronic device 10*b* with the vehicle 12 neither increases the weight of the vehicle 12, nor does it require any installation space available on the vehicle 12 for the second electronic device 10*b*. This also enables a comparatively large-volume and/or relatively heavy design of the second electronic device 10*b*, without impairing the usability of the prediction system 10/its second electronic device 10*b*. Furthermore, the interaction of the second electronic device 10*b* with the vehicle 12 is also possible in this case, without increasing the manufacturing costs for the vehicle 12.

As shown graphically in FIG. 4, the second electronic device 10*b* equipped with the second communication device 14*b* can also interact with a plurality of vehicles 12 to execute the prediction/early diagnosis. Since vehicles 12 are, as a rule, equipped with their own communication device 14*a*, the second electronic device 10*b* can thus be used in many ways. Optionally, an early diagnosis can also be executed "in 2 levels" in this way by initially creating the prediction at vehicle level and then correlating it "in the higher level" of the cloud via a vehicle fleet consisting of a plurality of/many vehicles 12. The prediction system 10/its second electronic device 10*b* can additionally be designed/programmed as an advantageous further development to send text sequences to the respective vehicle 12 to verify the prediction, preferably test sequences whose execution on the vehicle 12 does not affect its driving behavior or the comfort of its driver.

The invention claimed is:

1. A prediction system for at least one brake system component of a brake system of a vehicle, comprising:

a first electronic device configured and/or programmed to ascertain value groups, which each includes at least two different variables, during at least one driver-induced and/or autonomous braking process of the vehicle, wherein, using the first electronic device, the at least two variables of the same value group can be ascertained simultaneously and in a braking situation in which at least one of the variables lies outside its respective specified normal value range and/or a temporal derivative of at least one of the variables lies outside a quasi-static range respectively specified for the respective variable, and wherein each of at least one first variable of the at least two variables represents: (i) a brake pedal actuation by a driver of the vehicle, and/or (ii) a brake request specification from an automatic brake or drive control system and/or a controller of the vehicle, and wherein each of at least one second variable of the at least two variables represents: (i) a response of at least the one brake system component of the brake system to the brake pedal actuation and/or a brake request specification variable, and/or (ii) a state on and/or in at least the one brake system component, and/or (iii) a physical variable of the vehicle braked using the brake system;

wherein the first electronic device and/or a second electronic device of the prediction system is configured to, using the ascertained value groups, estimate whether an occurrence of at least one functional impairment of at least the one brake system component of the brake system is probable at least during a specified prediction time interval.

2. The prediction system according to claim 1, wherein the first electronic device and/or the second electronic device is configured to enter the ascertained value groups into a coordinate system with at least one first axis indicating the at least one first variable and at least one second axis indicating the at least one second variable.

3. The prediction system according to claim 2, wherein the first electronic device is configured to ascertain value groups that, in addition to the at least one first variable and the at least one second variable, also include a friction coefficient of a road on which the vehicle is simultaneously traveling.

4. The prediction system according to claim 3, wherein the first electronic device and/or the second electronic device is configured to enter the ascertained value groups into the coordinate system that, in addition to the at least one first axis and the at least one second axis, also includes at least one friction coefficient axis indicating the friction coefficient or sectors indicating the friction coefficient in a plane spanned by the first axis and the second axis.

5. The prediction system according to claim 2, wherein the first electronic device and/or the second electronic device is configured to assign brake operating points to each of the value groups entered into the coordinate system and to estimate, taking additional account of a distribution of the brake operating points, whether the occurrence of at least one functional impairment of at least the one brake system component of the brake system is probable at least during the specified prediction time interval.

6. The prediction system according to claim 1, wherein the first electronic device is further configured to ascertain value groups that, in addition to the at least one first variable and the at least one second variable, also include at least one third variable, wherein the at least one third variable is ascertained simultaneously with the at least one first variable and the at least one second variable of the same value group and represents an environmental parameter.

7. The prediction system according to claim 6, wherein:

the first electronic device and/or the second electronic device is configured to enter the ascertained value groups into a coordinate system with at least one first axis indicating the at least one first variable and at least one second axis indicating the at least one second variable, and the first electronic device and/or the second electronic device is configured to enter the value groups into the coordinate system that, in addition to the at least one first axis and the at least one second axis, also includes at least one third axis indicating the at least one third variable.

8. The prediction system according to claim 1, wherein the first electronic device is mounted on the vehicle and is configured to control a first communication device of the first electronic device or of the vehicle equipped with the first electronic device to transmit data including the ascertained value groups and/or at least one coordinate system with the ascertained value groups to a second communication device of the second electronic device, which is separate from the vehicle, and wherein the second communication device is configured to receive the value groups transmitted by the first communication device.

9. A prediction method for at least one brake system component of a brake system of a vehicle, the method comprising the following steps:

ascertaining value groups, which each includes at least two different variables, during at least one driver-induced and/or autonomous braking process of the vehicle, wherein the at least two variables of the same value group are ascertained simultaneously and in a braking situation in which at least one of the variables lies outside its respective specified normal value range and/or a temporal derivative of at least one of the variables lies outside a quasi-static range respectively specified for the respective variable, and wherein each of at least one first variable of the at least two variables represents: (i) a brake pedal actuation by a driver of the vehicle, and/or (ii) a brake request specification from an automatic brake or drive control system and/or a controller of the vehicle, and wherein each of at least one second variable of the at least two variables represents: (i) a response of at least the one brake system component of the brake system to the brake pedal actuation and/or the at least one brake request specification variable, and/or (ii) a state on and/or in at least the one brake system component, and/or (ii) a physical variable of the vehicle braked using the brake system; and estimating, using the ascertained value groups, whether an occurrence of at least one functional impairment of at least the one brake system component of the brake system is probable at least during a specified prediction time interval.

10. The prediction method according to claim 9, wherein at least one of the following is ascertained as the at least one first variable: (i) a rod path of an input rod connected to the brake pedal, (ii) an adjustment speed of the input rod, (iii) a target motor current of a motor of a motorized brake pressure build-up device of the brake system requested by the automatic brake or drive control system and/or the controller, (iv) a target operating voltage of the motor of the motorized brake pressure build-up device requested by the automatic brake or drive control system and/or the controller, (v) a target motor torque of the motor of the motorized brake pressure build-up device requested by the automatic brake or drive control system and/or the controller, (vi) a target power consumption of the motor of the motorized brake pressure build-up device requested by the automatic brake or drive control system and/or the controller, (vii) a target adjustment path of at least one adjustable piston of the motorized brake pressure build-up device requested by the automatic brake or drive control system and/or the controller, (viii) a target pumping rate of at least one pump used in the brake system requested by the automatic brake or drive control system and/or the controller.

11. The prediction method according to claim 9, wherein at least one of the following is ascertained as the at least one second variable: (i) a master brake cylinder pressure in a master brake cylinder of the brake system, (ii) at least one brake pressure in at least one wheel brake cylinder of the brake system, (iii) a motor current of the motor of the motorized brake pressure build-up device of the brake system, (iv) an operating voltage of the motor of the motorized brake pressure build-up device, (v) a motor torque of the motor of the motorized brake pressure build-up device, (vi) a power consumption of the motor of the motorized brake pressure build-up device, (vii) an adjustment path of the at least one adjustable piston of the motorized brake pressure build-up device, (viii) controller state information about a possibly executed brake pressure control or a possibly executed driving dynamics control, (ix) at least one temperature at and/or in at least the motorized brake pressure build-up device, (x) a pumping rate of the at least one pump used in the brake system, (xi) a transmission efficiency of a transmission of the brake system connected to the motorized brake pressure build-up device, (xii) at least one switching state of at least one valve of the brake system, (xiii) a braking force applied to the vehicle using the brake system, (xiv) a braking torque applied to the vehicle using the brake system, (xv) a steering angle of the vehicle, (xvi) a yaw rate of the vehicle, (xvii) a vehicle deceleration applied to the vehicle using the brake system, (xviii) a longitudinal speed of the vehicle, (xix) a lateral speed of the vehicle, (xx) a lateral acceleration of the vehicle, (xxi) an on-board power supply voltage of an on-board power supply of the vehicle.

12. The prediction method according to claim 9, wherein value groups are ascertained that, in addition to the at least one first variable and the at least one second variable, also include at least one third variable, wherein the at least one third variable is ascertained simultaneously with the at least one first variable and the at least one second variable of the same value group and represents an environmental parameter.

13. The prediction method according to claim 12, wherein at least one of the following is ascertained as the at least one third variable: (i) a friction coefficient of a road on which the vehicle is simultaneously traveling, (ii) a road inclination angle, (iii) a windshield wiper status, (iv) an outside temperature are ascertained as the at least one third variable.

* * * * *